Figure 1:
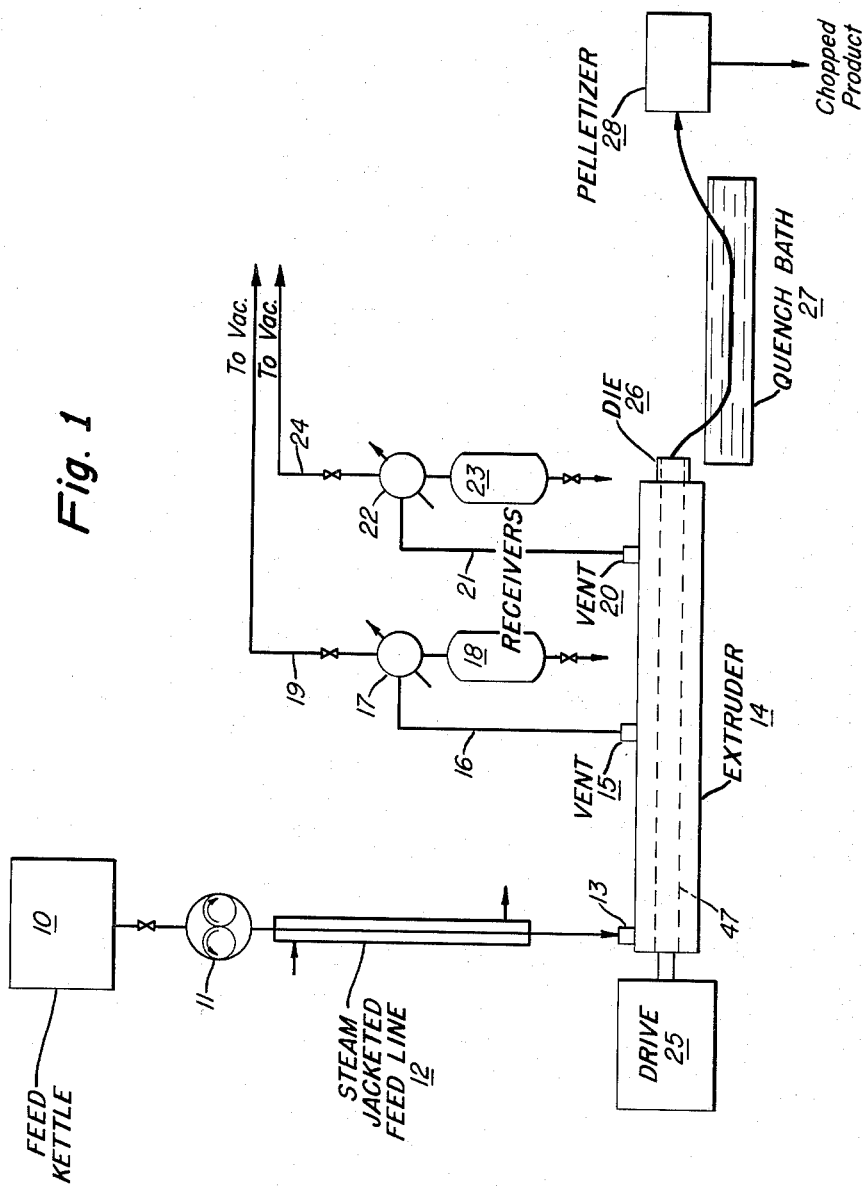

July 18, 1961

W. W. TWADDLE 2,992,679

VENTED EXTRUDER STRUCTURE FOR REMOVING
VOLATILES FROM SOLID POLYMER

Filed Dec. 15, 1958

2 Sheets-Sheet 2

INVENTOR.
Warren W. Twaddle

BY

ATTORNEY

United States Patent Office

2,992,679
Patented July 18, 1961

2,992,679
VENTED EXTRUDER STRUCTURE FOR REMOVING VOLATILES FROM SOLID POLYMER
Warren W. Twaddle, Hammond, Ind., assignor to Standard Oil Company, Chicago, Ill., a corporation of Indiana
Filed Dec. 15, 1958, Ser. No. 780,462
6 Claims. (Cl. 159—2)

This invention relates to an improvement in single screw vented extruder structure whereby such structure may be employed on a commercial scale for removing volatile or vaporizable materials from normally solid polymer.

Twin screw extruders may be used for removing volatile material from viscous plastics (Belgian Patent 547,648, U.S. 2,441,222, U.S. 2,615,199, etc.) but they are expensive to install and operate; I have found the production rate with a twin screw extruder to be about the same as that of my single screw extruder but the cost of the twin screw extruder is at least two or three times that of the single screw extruder. Single screw extruders heretofore known to the art have been inoperative for the removal of solvents from solid polymers at reasonable rates and efficiencies, particularly when the polymers were heat sensitive and of high viscosity. An object of this invention is to provide a single screw vented extruder system for devolatilizing normally solid polymer, which system has increased capacity, which is of improved efficiency and which can be installed and operated at far less expense than double screw systems for devolatilizing a given amount of polymer to a required extent. Other objects will be apparent as the detailed description of the invention proceeds.

To accomplish my objective, I employ a new combination of improved impelling means, heating means and venting means. The impelling means may include a gear pump for feeding the very viscous polymer solution to the inlet of the vented extruder, and it includes a specially designed extruder screw driven by a motor or other means. The heating may include a jacketed line between the pump and the extruder inlet, it includes one or more heating jackets around the extruder itself, and it preferably includes a heating element in the screw shaft opposite a vapor vent. The venting means is a large outlet having a cross sectional dimension greater than the screw diameter and preferably about 1.5 to 3 screw diameters, which outlet is after a decompression zone (wherein vapor may be flashed from polymer solution) and more than 1 screw diameter ahead of a following compression zone.

The depth of the screw threads, sometimes called flight depth, which is essentially the distance between the rotating shaft and the inside diameter of the extruder casing, should be in the range of about .3 to 4 inches in the vicinity of the vent in order to allow space for separation and removal of liberated vapors at sufficiently low velocity to avoid blowing molten polymer out through the vent line. The initial compression may be produced by the inlet pump, heating may be effected in a line between the pump and the extruder inlet and decompression may be effected close to the extruder inlet; for best results, however, the polymer is heated immediately ahead of the decompression zone by passing it through a heated initial section of the extruder where the thread depth is only about .1 to .25 inch for a length of about 3 to 10 shaft diameters. In the decompression zone there is a flashing of liberated vapors and in the following zone there is more and more liberation of vapors as the molten polymer is subjected to the kneading action which constantly exposes new surfaces to the high vacuum. In view of the vacuum which is maintained in the vapor outlet, this outlet must be of large cross sectional area, the latter having a dimension parallel to the screw which is greater than 1 screw diameter and is preferably of the order of 1.5 to 3 screw diameters. The outlet should be spaced from the compression zone by at least 1 screw diameter in order to avoid excessive polymer buildup and plugging of the vapor outlet. The vapor liberation zone usually requires about 3 to 10 screw diameters and, after compression, the thread depth on the impelling screw may be of the order of .05 to .2 inch for a distance of about 2 to 8 shaft diameters.

Separate heaters, which may be in the form of electrical heaters or jackets through which heating fluid is passed, preferably surround the inlet, vaporizing and exit portions of the extruder casing but the required large cross sectional area of the vapor outlet necessarily decreases the heating area at the point where application of heat is of greatest importance. To alleviate this problem, I preferably provide the screw shaft with a bore which is large enough to receive a heating cartridge, which cartridge is installed in the shaft opposite the communication of the vapor vent therewith.

It is usually desired to reduce the volatiles content of a polymer to a level below 1 percent and preferably below .5 percent. If the original charge contains as much as 30 to 40 percent solvent, the throughput through a given vented extruder is necessarily quite low if the final product is to have the desired freedom from volatile matter. In order to increase the throughput with minimum investment and operating expense, I may employ a plurality of vapor venting zones wherein the thread depth is .3 to 4 inches with intervening heating zones wherein the thread depth is of the order of .1 to .25 inch. In such multi-vent single screw extruder systems, the heating may be more gradual, the vacuum at the first vapor outlet may be of the order of 100 to 250 millimeters of mercury absolute and the vacuum in the second vent may be of the order of 25 to 100 millimeters of mercury absolute. With commercial polystyrene having an intrinsic viscosity of approximately 1 containing a solvent such as xylene, the temperature for solvent elimination should be at least about 200° C. but should not exceed about 300° C. The multi-vent system offers additional flexibility of operation since the degree of vacuum may be separately controlled at each vent and the temperature likewise may be separately controlled. A double vented 2 inch extruder can thus handle at least 80 pounds per hour of polystyrene containing as much as 30 to 40 percent benzene or xylene solvent and produce a substantially volatile-free polymer product.

Figure 2:
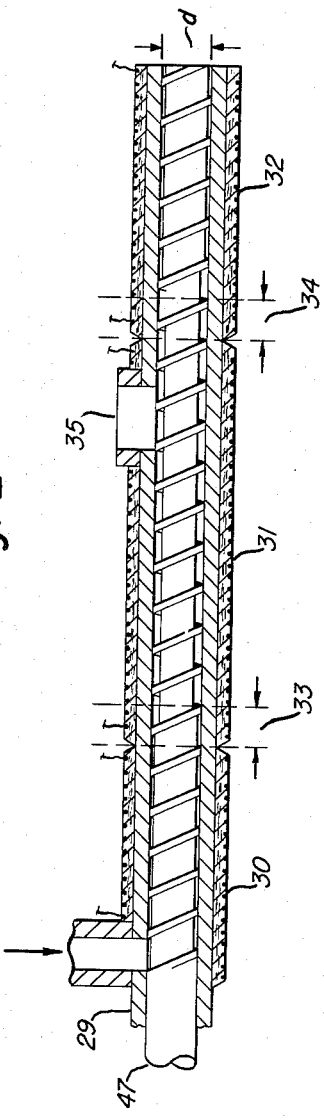
Figure 3:
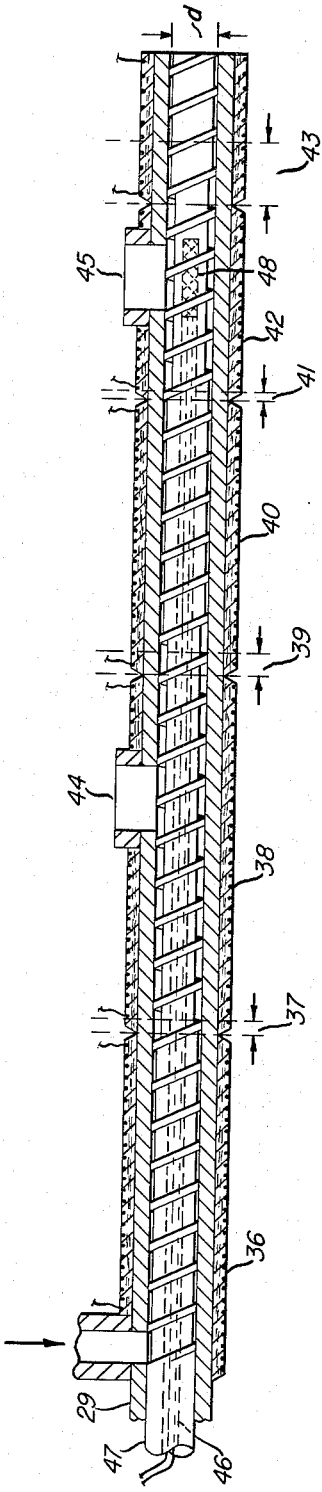

The invention will be more clearly understood from the following detailed description of specific examples thereof read in conjunction with the accompanying drawings which form a part of the specification and in which FIGURE 1 is a schematic flow diagram of my entire extruder system employing two vacuum vents, FIGURE 2 is a detailed illustration of the screw of a single vent extruder, and FIGURE 3 is a detailed view of the screw of a double vent extruder.

The apparatus which will now be described was designed for removing a solvent such as xylene from a solid polymer such as polystyrene but it should be understood that the invention is equally applicable to the removal of solvents or other volatile or vaporizable materials from polymers such as polyethylene, polypropylene, etc. or other polymer or plastic materials. The polystyrene solution may be one produced by dissolving a commercial polystyrene in a solvent but the invention is particularly directed to solving the problem of removing solvent from the solution in which the polymer is produced, e.g. by the method described in U.S. 2,813,089. A normally solid polystyrene having an intrinsic viscosity of about 1 containing about 5 to 40 percent of solvent such as benzene or xylene is introduced from feed kettle 10 by pump 11 is preferably a gear pump through steam packeted feed line 12 to inlet 13 of single screw extruder 14. In the initial part of the extruder the viscous polymer solution is heated to about 260 to 290° C. and then it passes through a decompression zone wherein solvent is flashed from the molten polymer so that it may be withdrawn through outlet vent 15 and vent line 16 to cooler 17 from which solvent may be introduced to tank 18, a vacuum of the order of 100 to 250 millimeters of mercury absolute, e.g., about 150 millimeters being maintained by a vacuum pump at the end of evacuating line 19. About one or two diameters downstream of the first vent, the molten polymer is compressed and reheated to about 290° C. and again decompressed to liberate residual gasiform or vaporizable material to second vent outlet 20 through second vent line 21 which leads to condenser 22, the condensed solvent being introduced to tank 23 and a vacuum of the order of 25 to 100 millimeters of mercury absolute being maintained by a vacuum pump through evacuating line 24. The extruder screw is driven by motor or other drive means 25 and the devolatilized polymer is finally extruded through a final discharge opening or die 26 into quench bath 27 from which the polymer may be passed to pelletizer 28.

The design of the extruder screw is of vital importance to the satisfactory functioning of this system. The single screw extruder comprises a tubular casing (called the extruder barrel) 29 having an inside or bore diameter, "d," in the range of 2 to 12 inches, the diameter being 2 inches in this particular example. Separate heating jackets 30, 31 and 32 surround the casing at the inlet, mid portion and exit, respectively. In this example wherein the inside diameter of the casing and the screw diameter is about 2 inches, the initial or preheat section is about 13 inches, the mid or vapor releasing section is about 18 inches and the final or discharge section is about 13 inches, the decompression zone 33 being about 2 inches and the compression zone 34 also being about 2 inches. The flight depth or thread depth in the initial section is 0.15 inch, the thread depth in the vapor releasing section is 0.4 inch and the thread depth in the final section is 0.15 inch. The vapor outlet 35 in this example is a 1 inch by 3 inch tangential vent and there is about 2 inches between the vapor outlet and the beginning of the compression zone 34. In this example the threads on the driving shaft have a 2 inch pitch (although this obviously may be varied) and the thread thickness or land is ¼ inch.

The modified screw for the dual vent extruder system shown in FIGURE 3 is similar to that hereinabove described in that the threads are of 2 inch pitch on a 2 inch shaft. However, the preheat section 36 in this example is 16½ inches, the decompression zone 37 is ½ inch, the first vapor release zone 38 is 17½ inches, the first compression zone 39 is 1 inch, the second heating zone 40 is 14 inches, the second decompression zone 41 is ½ inch, the second vapor release zone 42 is 9½ inches, the final compression zone 43 is about 3 inches, the distance between the vapor releasing zone 42 and the end of the screw being about 7 inches. In this example the thread depth in zone 36 is .15 inch, in zone 38 is 0.4 inch, in zone 40 is .015 inch, in zone 42 is 0.4 inch, and in the final zone is 0.15 inch. Each of the vapor vents 44 and 45 are 1 inch by 3 inches and are tangential to the screw at the side thereof where the screw is moving downwardly. In other words, the screw rotates toward the side on which the vent is located, and the vent is half the screw diameter in its shortest cross section. In this example a ½ inch diameter hole 46 is drilled through shaft 47 to the space opposite vent 45 and a heater cartridge 48 is positioned within the shaft for maintaining the temperature of materials at this point at about 290° C. in spite of the vaporization which is largely concentrated in this area.

In testing the single screw vented extruders as hereinabove described, the extruder screws were driven by a 7½ horsepower motor through a variable speed drive and a sight port was located above each vapor vent for observation of the vent opening and this portion of the screw. Electric heaters were employed on the barrel in these tests, a separate heater being employed in each of the three zones illustrated in FIGURE 2 and the five zones illustrated in FIGURE 3. The feed stock in these tests was a 60-70 percent polystyrene dissolved in xylene as hereinabove described and it was heated to about 150° C. before being introduced into the extruder inlet. Data obtained in test results are shown in the following tables.

*Single-vent test results*

| Screw speed, r.p.m. | Feed, percent polymer | Extruder temps., °F. | | Vent press., mm. Hg | Product rate, lbs./hr. | Percent volatiles in product |
|---|---|---|---|---|---|---|
| | | Feed zone | Devol. zone | | | |
| 52 | 61 | 350 | 550 | 25 | 30 | 1.0 |
| 52 | 67 | 350 | 550 | 25 | 32.5 | 0.5 |
| 100 | 67 | 350 | 550 | 25 | 32.5 | 0.7 |
| 180 | 67 | 350 | 550 | 25 | 32.5 | 0.8 |
| 52 | 67 | 550 | 550 | 25 | 32.5 | 0.2 |
| 133 | 61 | 350 | 550 | 25 | 63 | 2.6 |

*Dual-vent test results*

| Screw speed, r.p.m. | Feed, percent polymer | Extruder temps., °F. | Vent press., mm. Hg | | Product rate, lbs./hr. | Percent volatiles in product |
|---|---|---|---|---|---|---|
| | | | Vent 1 | Vent 2 | | |
| 88 | 65 | 550 | 75 | 25 | 48 | 0.2 |
| 150 | 65 | 550 | 75 | 25 | 75 | 0.2 |
| 180 | 69 | 550 | 150 | 25 | 100 | 0.4 |
| 180 | 69 | 550 | 100 | 100 | 100 | 0.5 |
| 180 | 72 | 550 | 150 | 25 | 80 | 0.3 |

From the foregoing data it will be seen that with the single vent extruder the product rate of 63 pounds per hour did not give the desired devolatilization but that substantial devolatilization was obtainable at a product rate of about 32 pounds per hour. With the dual vent system it will be observed that the product rate in the range of 80 to 100 pounds per hour could be satifactorily attained in continuous operation for effecting substantially complete devolatilization. The data also show that best results are attained with relatively high temperatures but the temperatures must be below those at which the polymer is degraded or suffers a color impairment; for polystyrene, the temperature should not exceed about 300° C. Best results are obtained by operating the shaft at the maximum permissible temperature adjacent the final vapor outlet by means of the heater cartridge within the shaft itself.

While the foregoing examples employed a all diameter screw for handling only about 50 to 100 pounds per hour of product, the design of larger screws and equipment will be apparent from the foregoing description to those skilled in the art.

I claim:

1. Apparatus for removing vaporizable material from normally solid polymer at temperatures above the melting point but below the decomposition temperature of the polymer, which apparatus comprises a tubular casing having an inside diameter, "d," in the range of 2 to 12 inches and having a ratio of length to "d" in the range of about 15:1 to 40:1, an inlet at one end of the casing, a discharge opening at the other end, at least one vapor outlet between the inlet and the discharge opening, at least one heating jacket around the casing, a shaft extending through the casing from the inlet to a point adjacent the discharge opening forming an initial section, a decompression section, a vapor releasing section and a final section within said casing, screw threads on said shaft for positively moving fluent material from the inlet to the discharge opening when the shaft is rotated, the depth of the threads in said initial section being about .1 to .25 inch for an axial distance of about $3d$ to $10d$ from said inlet, the depth of the threads in said decompression section being at least twice the depth of said threads in said initial section for an axial distance of less than $2d$ from said initial section, the depth of the threads in said vapor releasing section being about .3 inch to 4 inches for an axial distance of about $4d$ to $11d$ from said decompression section, the depth of the threads in said final section being no greater than said depth of said threads in said initial section for an axial distance of about $2d$ to $8d$ from said vapor releasing section, said vapor outlet having an axial dimension parallel to the shaft which is greater than $d$ and said vapor outlet being between the decompression and compression zones and at least an axial distance of $d$ from the compression zone.

2. The apparatus of claim 1 which includes a heater within that portion of said shaft which is adjacent the vapor outlet.

3. The apparatus of claim 1 which includes a second heating zone following said final section, a second heating zone, a second vapor outlet, a second compression zone, and a final discharge zone, the second vapor outlet being between the second decompression and the second compression zones and at least $1d$ from the second compression zone.

4. Apparatus for removing solvent from normally solid polymer at temperatures above the melting point but below the decomposition temperature of the polymer which apparatus comprises a single screw extruder having an inlet and an outlet, a vapor vent communicating with said extruder between said inlet and said outlet, the shaft of the extruder being provided with an opening, a heater within said opening, said opening being at that portion of said shaft where the vapor vent communicates therewith.

5. Apparatus for removing solvent from normally solid polymer at temperatures above the melting point but below the decomposition temperature of the polymers, which apparatus comprises a single screw extruder having an inlet and a polymer outlet, a pump for introducing liquid solvent-containing polymer into said inlet, a heating jacket for increasing the temperature of the introduced polymer and solvent to permit vaporization of the solvent, a vapor outlet between the inlet and polymer outlet of the extruder, an evacuating line communicating with the vapor outlet for maintaining a vacuum at the vapor outlet, the vapor outlet having a cross section in a plane parallel to the axis of said screw extruder greater than the cross section of said screw extruder, and the screw thread depth in the vicinity of the vapor outlet being greater than the screw thread depth in the vicinity of the downstream end of the extruder.

6. A vacuum extruder which comprises a cylindrical conduit, a single concentric shaft spaced from the inner walls of said conduit, at least one screw flight carried by said shaft for feeding concentrated polymer solution from an inlet end of the extruder to an extruder outlet, a vapor conduit communicating with the interior of the cylindrical conduit, a vapor evacuator connected to said vapor conduit and a heating jacket at least partially surrounding said cylindrical conduit whereby a polymer solution may be introduced as a liquid into said vacuum extruder and passed therethrough at high temperature and reduced pressure so that substantially all solvent may be removed from said solution by the time it reaches the extrusion outlet.

References Cited in the file of this patent

UNITED STATES PATENTS 2,615,199    Fuller ---------------- Oct. 28, 1952